(12) United States Patent
Krupenkin et al.

(10) Patent No.: US 8,742,649 B2
(45) Date of Patent: Jun. 3, 2014

(54) METHOD AND APPARATUS FOR MECHANICAL ENERGY HARVESTING USING PLANAR MICROFLUIDIC DEVICE

(76) Inventors: Thomas Nikita Krupenkin, Madison, WI (US); Joseph Ashley Taylor, Madison, WI (US)

( * ) Notice: Subject to any disclaimer, the term of this patent is extended or adjusted under 35 U.S.C. 154(b) by 256 days.

(21) Appl. No.: 13/352,588

(22) Filed: Jan. 18, 2012

(65) Prior Publication Data

US 2012/0181901 A1 Jul. 19, 2012

Related U.S. Application Data

(60) Provisional application No. 61/433,992, filed on Jan. 19, 2011.

(51) Int. Cl.
*H01L 41/113* (2006.01)

(52) U.S. Cl.
USPC ............................ 310/339; 310/800; 290/1 R

(58) Field of Classification Search
CPC ....... F23Q 3/002; H02N 2/18; H01L 41/1132
USPC ........................................... 310/339; 290/1 R
See application file for complete search history.

(56) References Cited

U.S. PATENT DOCUMENTS

| | | | | |
|---|---|---|---|---|
| 4,126,822 | A * | 11/1978 | Wahlstrom | 322/2 A |
| 7,037,158 | B2 * | 5/2006 | Mishima | 445/24 |
| 7,898,096 | B1 * | 3/2011 | Krupenkin | 290/1 R |
| 7,944,123 | B2 | 5/2011 | Gualtieri | |
| 7,977,852 | B2 | 7/2011 | Ward et al. | |
| 2004/0253123 | A1 | 12/2004 | Xie et al. | |
| 2006/0077762 | A1 | 4/2006 | Boland et al. | |
| 2007/0159031 | A1 * | 7/2007 | Yokoyama et al. | 310/800 |
| 2008/0089005 | A1 * | 4/2008 | Choi et al. | 361/278 |
| 2009/0080138 | A1 * | 3/2009 | Lohndorf et al. | 361/292 |
| 2010/0291403 | A1 | 11/2010 | Clark et al. | |
| 2010/0308599 | A1 | 12/2010 | Pabon et al. | |
| 2011/0001493 | A1 | 1/2011 | Lohndorf et al. | |
| 2011/0309618 | A1 | 12/2011 | Gieras et al. | |

* cited by examiner

*Primary Examiner* — Derek Rosenau
*Assistant Examiner* — Bryan Gordon
(74) *Attorney, Agent, or Firm* — Wendy W Koba

(57) ABSTRACT

An apparatus comprising a mechanical-to-electrical energy converting device utilizes an array of microfluidic droplets in association with a planar electrode and separated by a dielectric layer to form a capacitive structure. An elastic spacer is also disposed between the planar electrode and array of droplets, such that as the spacer is compressed, the contact area of the droplets and the dielectric is increased—increasing the total capacitance value. Periodic changes in the force applied to the elastic spacer (such as associated with vibrational motion) creates a periodic change in the capacitance value, generating an electrical current flow between the planar electrode and array of conductive droplets.

9 Claims, 4 Drawing Sheets

METHOD AND APPARATUS FOR MECHANICAL ENERGY HARVESTING USING PLANAR MICROFLUIDIC DEVICE

CROSS-REFERENCE TO RELATED APPLICATIONS

This application claims the benefit of U.S. Provisional Application No. 61/433,992, filed Jan. 19, 2011 and herein incorporated by reference.

TECHNICAL FIELD

The present invention relates to the harvesting of electrical energy from mechanical, vibrational movement and, more particularly, to the utilization of a plurality of microfluidic elements to convert vibrational energy into useful electrical energy.

BACKGROUND OF THE INVENTION

Currently, the majority of autonomous and mobile electronic systems are powered by electrochemical batteries. Although the battery quality has substantially improved over the last two decades, their energy density has not greatly increased. At present, factors such as cost, weight. limited service time and waste disposal problems (intrinsic to batteries) are impeding the advance in many areas of electronics. The problem is particularly acute in the portable electronics market, where rapidly growing performance and sophistication of mobile electronic devices has led to ever-increasing power demands that traditional electrochemical batteries are unable to meet.

One of the technologies that holds great promise to substantially alleviate the current reliance on the electrochemical batteries is high power energy harvesting. The concept of energy harvesting works towards developing self-powered devices that do not require replaceable power supplies. In cases where high mobility and high power output is required, harvesters that convert mechanical energy into electrical energy are particularly promising, inasmuch as they can tap into a variety of "high power density" energy sources that exhibit mechanical vibrations.

High power harvesting of mechanical energy is a long-recognized concept, yet it has not been able to be commercialized, due at least in part to the lack of a viable energy harvesting technology. Existing methods of mechanical-to-electrical energy conversion such as electromagnetic, piezoelectric, or electrostatic do not allow for effective direct coupling to most of the high power environmental mechanical energy sources. Bulky and expensive mechanical or hydraulic transducers are required to convert a broad range of aperiodic forces and displacements typically encountered in nature into a form accessible for conversion using these methods.

Recently, a new approach to energy harvesting has been proposed that substantially alleviates the above-mentioned problems, the new approach being the use of a micro fluidics-based energy harvester. In particular, a high power microfluidics-based energy harvester is disclosed in U.S. Pat. No. 7,898,096 entitled "Method and Apparatus for Energy Harvesting Using Micro fluidics" issued to T. N. Krupenkin on Mar. 2, 2011 and herein incorporated by reference. The Krupenkin energy harvester generates electrical energy through the interaction of thousands of microscopic liquid droplets with a network of thin-film electrodes. A typical configuration of the Krupenkin energy harvester is capable of generating several watts of power. An exemplary embodiment of this Krupenkin energy harvester is shown in FIG. 1, which illustrates a train of energy-producing conductive droplets 1 located along a microscopically thin channel 2, where droplets 1 are suspended within a liquid dielectric medium 3 and are hydraulically actuated by applying a pressure differential between the ends of channel 2. Pluralities of separate electrodes 5-1 and 5-2 are disposed along either side of channel 2, which engage with droplets 1 as they move back and forth within channel 2 during changes in pressure. As conductive droplets 1 move along channel 2, they create arrays of capacitors with electrodes 5-1 and 5-2, the capacitors changing in stored charge as the droplets move back and worth, generating an electrical current flow. This type of hydraulic activation method provides an important advantage as it allows for efficient direct coupling with a wide range of high power environmental mechanical energy sources, including human locomotion.

While the microfluidic-based energy harvester as shown in FIG. 1 exhibits a significant improvement over the state of the art, this actuation method is not well-suited for applications where the energy is being harvested from mechanical vibrations, since the displacement amplitude of a vibration is often too small to initiate motion of droplets along a channel. Yet, such vibrations constitute a readily available source of energy in many important environments, including transportation (e.g., automotive, aerospace, rail), industrial machinery, and the like. Thus, any method that can provide effective actuation of microscopically small liquid droplets by environmental mechanical vibrations would be highly beneficial, as it would allow for the extension of energy harvesting to a broader range of environments.

SUMMARY OF THE INVENTION

The needs remaining in the art are addressed by the present invention, which relates to the harvesting of electrical energy from mechanical, vibrational movement and, more particularly, to the utilization of a plurality of microfluidic elements to convert vibrational energy into useful electrical energy.

In accordance with an exemplary embodiment of the present invention, an array of conductive liquid droplets is disposed on a base substrate and separated from a dielectric-covered electrode by an elastic spacer, forming a capacitive array structure. The elastic spacer is periodically compressed in response to external vibrations, which in turn causes the droplets to be periodically squeezed between the electrode and base substrate. The droplet compression increases the contact area between the droplets and the electrode, creating periodic changes in the amount of electrical charge accumulated between the electrodes, resulting in electrical energy production in the form of a current flowing between the electrodes.

In one case, a proof mass may be attached to the microfluidic energy harvester, where any vibrations impressed upon the proof mass will be translated to the energy harvester and create periodic compression of the elastic spacer and compression of the plurality of conductive droplets. Alternatively, a direct force (period in nature) may be applied to the microfluidic energy harvester to generate electrical energy from the periodic compression of the conductive droplets.

In an alternative embodiment, multiple arrays of droplets may be stacked upon each other (with the associated elastic spacer and conductor), increasing the amount of energy that is produced for a given surface area (i.e., "footprint").

In one instance, the present invention can be defined as an apparatus for converting mechanical energy into electrical energy comprising a plurality of electrically conductive liquid droplets disposed in a planar arrangement, a planar electrode disposed in a parallel, spaced-apart relationship with the plurality of electrically conductive liquid droplets, a dielectric layer positioned between the plurality of electrically conductive liquid droplets and the planar electrode so as to form a capacitive structure therewith, an elastic spacer element disposed between the plurality of electrically conductive liquid droplets and the planar electrode so as to surround the plurality of electrically conductive liquid droplets, such that the application of mechanical energy to the apparatus compresses the elastic spacer element and the plurality of electrically conductive liquid droplets, increasing a contact area between said plurality of electrically conductive liquid droplets and the dielectric layer and also an overlap area with the planar electrode, and an electrical circuit means, electrically coupled between the plurality of electrically conductive liquid droplets and the planar electrode so as to apply a bias voltage therebetween and transfer electrical current generated in response to the change in capacitance associated with the change in overlap area to a power consuming element.

The present invention also describes a method of harvesting electrical energy from vibrational motion by disposing a plurality of electrically conductive liquid droplets on a substrate, covering the plurality of electrically conductive liquid droplets with a layer of dielectric material, surrounding the combination of the electrically conductive liquid droplets and layer of dielectric material with an elastic spacer element, positioning a planar electrode over the dielectric material so as to form a capacitive structure with the dielectric material and the plurality of electrically conductive liquid droplets, applying a predetermined bias voltage between the planar electrode and the plurality of electrically conductive liquid droplets, and subjecting the arrangement to a periodic mechanical force so as to compress and then decompress the elastic spacer and the plurality of electrically conductive liquid droplets in a manner to periodically change the capacitive value of the arrangement and create an electrical current output therefrom.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Before describing the details of the present invention, it is useful to provide an understanding of the underlying principles of electric energy harvesting from the basic microfluidic structure. Microfluidics is a branch of micro-fabrication which is concerned with developing means of handling small volumes of liquids. An aspect of the present invention is to utilize fluidic structures consisting of a large number of microscopic volumes of liquids (e.g., volumes from picoliters to microliters) as a working element in a mechanical-to-electrical energy conversion system. The large number of these microscopic elements (on the order of hundreds or even thousands) yields a realistic amount of electrical energy that can be generated from a relatively small volume of mechanical motion.

Indeed, the maximum electrical energy output that can be produced by an energy harvesting system of the present invention is directly proportional to the variation of the electrostatic field energy during the change in size of contact area between the droplets and the planar electrode, as mentioned above. For the simplest case where the structure has a total capacitance of C and is maintained at a given electrical voltage differential V, the electrostatic field energy $E_0$ is expressed as $E_0 = 0.5CV^2$. Here, $E_0$ is the energy measured in Joules, V is measured in volts, and C is the capacitance measured in Farads.

Figure 1:
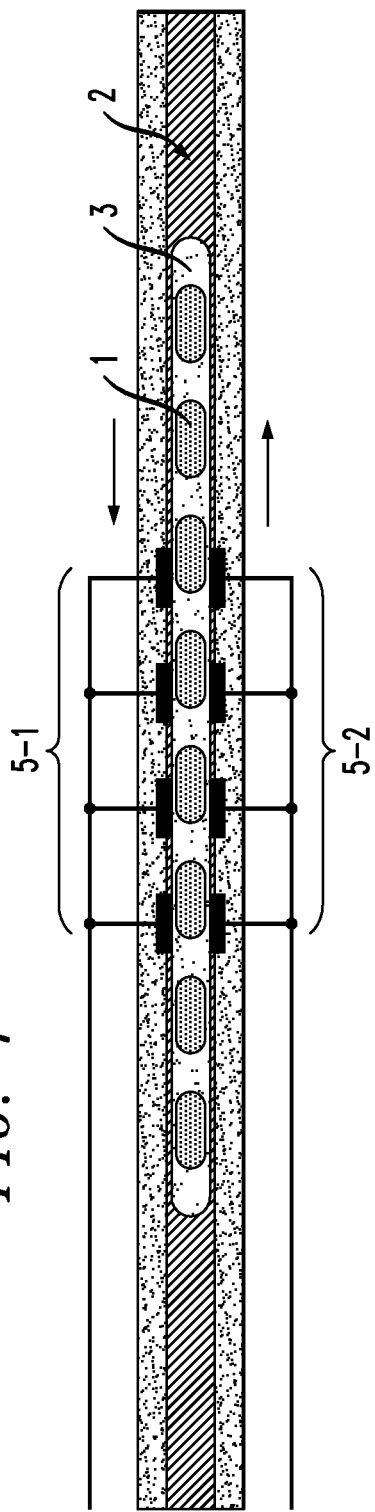
FIG. 1 depicts a prior type of microfluidic-based energy harvesting arrangement.
Figure 2:
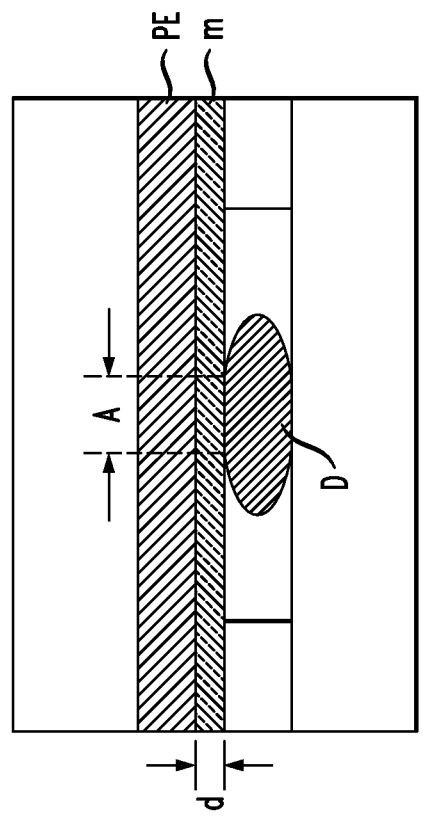
FIG. 2 is a simplified diagram of a single-droplet energy harvesting arrangement of the present invention.

The operating principle of the present invention can be understood with reference to the simplest embodiment, as illustrated in FIG. 2, which comprises a single microfluidic droplet D of a conductive liquid material and a planar electrode PE that are disposed in a parallel, spaced-apart relationship and separated by a distance d that is much smaller than their size. In this arrangement, capacitance value C of the structure can be expressed as $C = \epsilon_0 \epsilon A/d$, where A is the area of overlap between droplet D and planar electrode PE, measured in square meters, d is the separation between the electrode and the droplet, measured in meters, $\epsilon$ is the permittivity of the media M (dielectric layer) between droplet D and planar electrode PE, and $\epsilon_0 = 8.854 \times 10^{-12}$ Farad/meter (i.e., vacuum permittivity). Thus, the value of capacitance C can be increased either by increasing the overlap area A or by decreasing the distance d between droplet D and electrode PE.

In accordance with the present invention, an arrangement is provided that increases the value of C by periodically compressing conductive microfluidic droplet D to increase its contact area along the dielectric interface region M, thus increasing the overlap area A between droplet D and planar electrode PE. As described above, each periodic change in overlap area A results in electrical energy production through the periodic charging and discharging of the capacitor created by the combination of droplet D, dielectric medium M and planar electrode PE. When used in a system having a large plurality of droplets in contact with the planar electrode, significant amounts of electrical energy can be generated from a relatively small-dimensioned device.

There are a number of methods that can be used to extract electrical energy from a variable capacitor with a periodically alternating capacitance value and that can be adapted for use with the present invention. Some of those methods are disclosed in U.S. Pat. Nos. 6,936,994; 4,127,804; 6,127,812; 3,094,653; 3,013,201; 4,054,826; 6,750,590; 4,897,592; 4,126,822; 2,567,373; 3,405,334; 6,255,758; 7,112,911; 4,595,852 and 4,814,657, all of which are incorporated by reference herein in their entirety.

Figure 3:
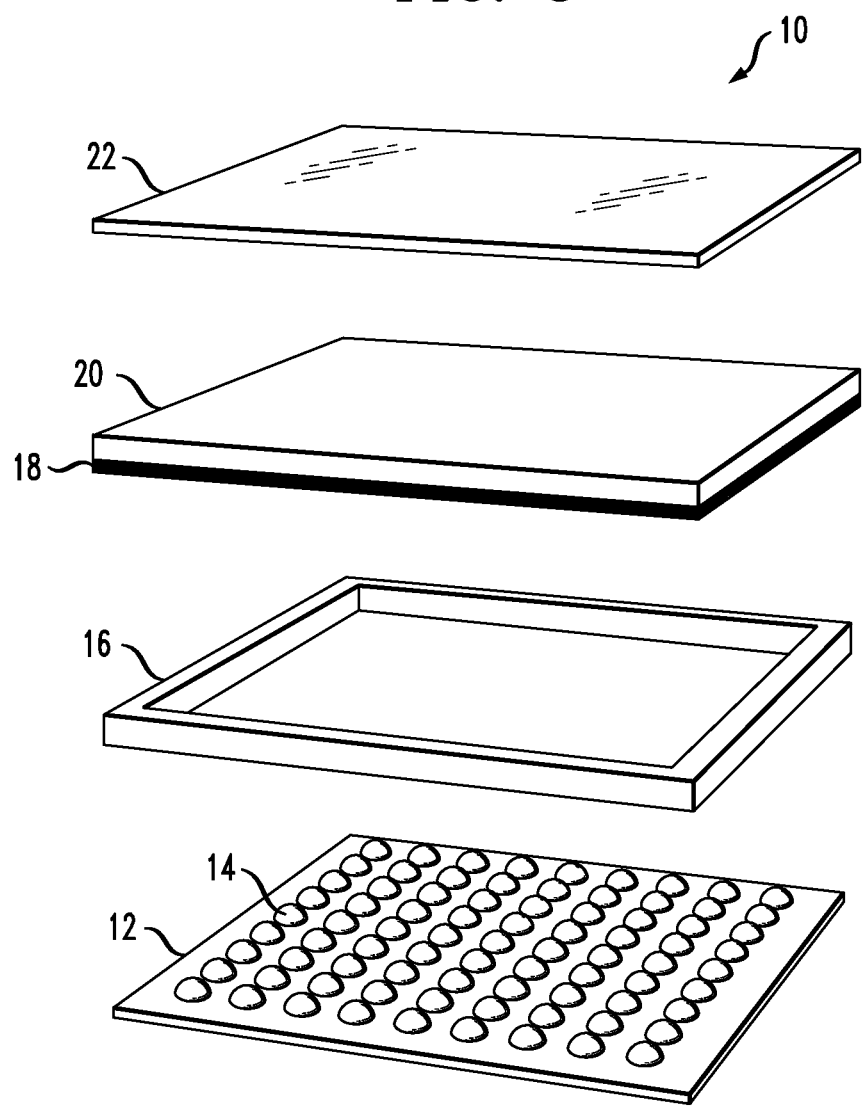
FIG. 3 is an exploded, isometric view of an exemplary microfluidic-based energy harvesting arrangement of the present invention, utilizing a plurality of liquid droplets in combination with a planar electrode to harvest electrical energy from vibrational motion.

FIG. 3 is an exploded isometric view of an energy harvesting arrangement 10 of the present invention utilizing a plurality of microfluidic droplets in conjunction with a single planar electrode. For the sake of simplicity and illustration, this arrangement is referred to as an energy harvesting pad, or simply a "pad". In the particular embodiment illustrated in FIG. 3, energy harvesting pad 10 includes a dielectric substrate 12, with an array of electrically conductive liquid droplets 14 disposed on a top surface 12-T of dielectric substrate 12. Examples of suitable electrically conductive liquids include, but are not limited to, aqueous salt solutions and molten salts. Exemplary aqueous salt solutions include 0.01 molar solutions of salts such as $CuSO_4$, $LiCl$, $KNO_3$, or $NaCl$. Exemplary molten salts include 1-ethyl-3-methylimidazolium tetrafluoroborate and 1-ethyl-3-methylimidazolium trifluoromethanesulfonate, which are both commercially available. Other suitable electrically conductive liquids include liquid metals, such as gallium, indium or mercury. It is to be understood that while the plurality of conductive droplets 14 are shown in an array arrangement in FIG. 3, any "planar" arrangement of droplets (including a random scattering) across top surface 12-T of substrate 12 may be used in a microfluidic energy harvester formed in accordance with the present invention.

Referring back to the drawing of FIG. 3, an elastic spacer 16 is positioned on top surface 12-T of dielectric substrate 12, and disposed to surround the plurality of conductive droplets 14 in the manner shown in FIG. 3. A relatively thin dielectric layer 18 and a planar electrode 20 are then disposed to overly the plurality of droplets 14 and spacer 16, with an upper dielectric substrate 22 positioned as a covering layer over planar electrode 20. Substrates 12 and 22 can be made of any solid dielectric material, such as glass, textolite, or a solid plastic, including polycarbonate, polypropylene, or polytetrafluoroethylene. Planar electrode 20 can be made of any solid conductive material, such as gold or tantalum, or indium tin oxide glass. A tin or gold film may also be used as planar electrode 20. Examples of suitable dielectric materials for relatively thin dielectric layer 18 include, but are not limited to, any solid dielectric such as tantalum oxide and silicon oxide, or polymers such as polyimide and parylene.

Figure 4:
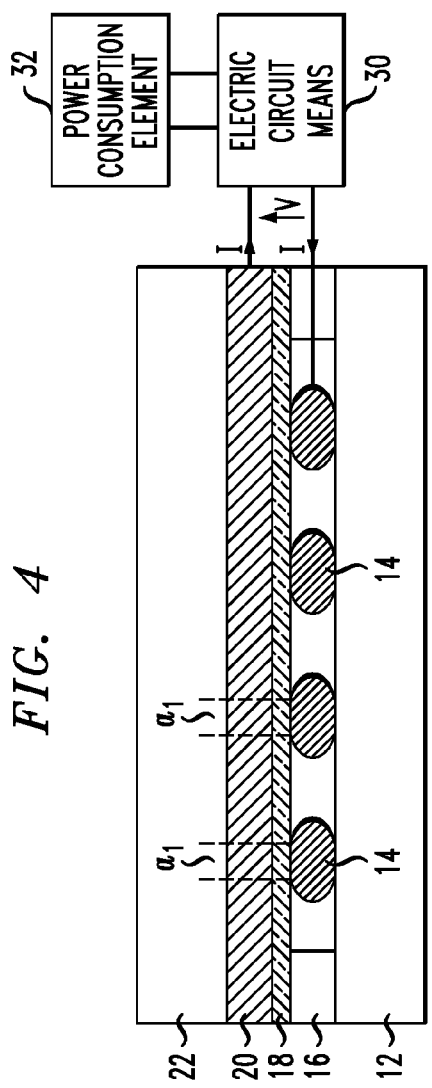
FIG. 4 is a side view of an exemplary embodiment of the present invention, the view of FIG. 4 being the fully decompressed state of the device.

FIG. 4 is a cut-away side view of an exemplary embodiment of the present invention, in this case in the non-compressed state. As shown, each droplet 14 has a contact area $a_1$ with overlying dielectric layer 18. Therefore, a plurality of N conductive droplets 14 will create a total overlap area Na, with planar electrode 20.

Figure 5:
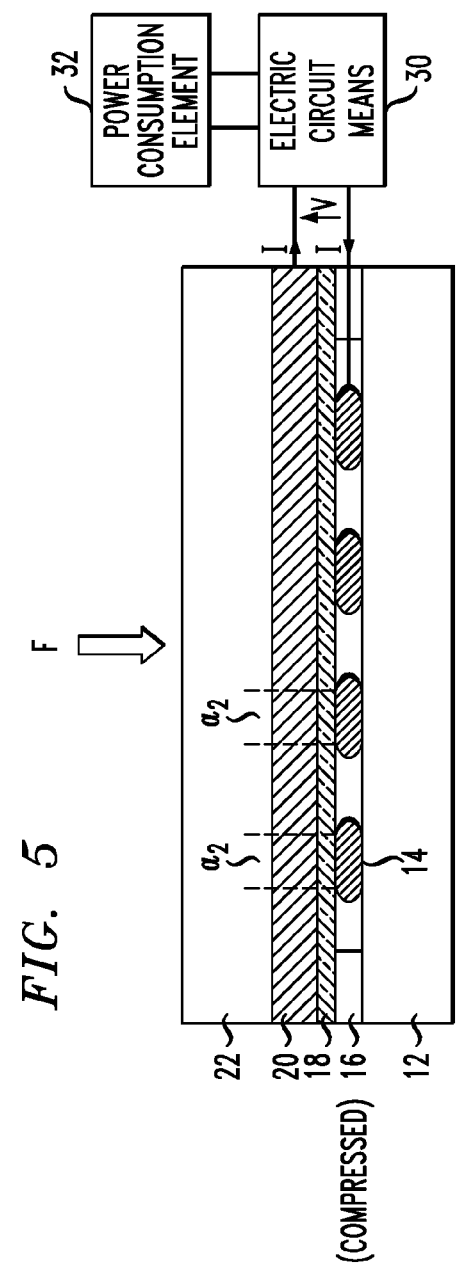
FIG. 5 is a side view of the same embodiment as shown in FIG. 4, in this case in the compressed state of the device, showing an increase in contact area between the plurality of conductive droplets and the dielectric layer.

In accordance with the present invention, an application of a force to pad 10 will compress elastic spacer 16, deforming droplets 14 in the manner shown in FIG. 5. As a result of the compression and deformation, the contact area between each droplet 14$t$ and dielectric layer 18 has increased to a value of $a_2$, where $a_2 > a_1$, increasing the overlap area to $Na_2$. Therefore, a periodic change in force—such as by vibration of pad 10—periodically changes the overlap area between the values of $Na_1$ and $Na_2$. Therefore, the change in overlap value results in the creation (harvesting) of electrical energy from the mechanical structure of pad 10 as a function of the periodic change in the amount of electrical charge accumulating between planar electrode 20 and the plurality of conductive droplets 14, generating a current flow in the structure.

As also shown in FIGS. 4 and 5, an electrical circuit means 30 is connected between planar electrode 20 and the plurality of conductive droplets 14 and is configured to apply a bias voltage V therebetween, as well as transfer the electrical current generated in response to the periodic compression of the plurality of conductive droplets 14 to a power consumption element 32. In one embodiment, electrical circuit means 30 is configured to switch the bias voltage V from zero to V each time the total capacitance C reaches its maximum value, i.e. when droplets 14 have been fully compressed. The bias voltage remains switched "on" and equal to V as long as the total capacitance decreases, that is, as long as the overlap area between the plurality of droplets 14 and planar electrode 20 continues to decrease. Once the total capacitance C starts to increase again, the bias voltage is switched back to zero.

The total charge q accumulated by a capacitor having capacitance C and voltage differential V can be expressed as: q=CV. Thus, at the first moment when the voltage V is applied between electrode 20 and droplets 14, the capacitor is charged and its total charge q reaches a maximum value $q_m = C_m V$. At that point, the total capacitor energy E reaches a value $E_1$ expressed as $E_1 = 0.5 C_m V^2$. As time progresses and compression of droplets 14 decreases, the value of capacitance C keeps decreasing and the amount of charge q accumulated by the capacitor keeps decreasing as well, thus forcing the excess charge back through electrical circuit means 30 and against the applied voltage V. By the time the total capacitance C approaches zero, all of the initial charge $q_m$ is forced back through electrical circuit means 30 and produces the work $E_2 = q_m V = C_m V^2$. Thus, the total energy $E_1$ generated during one cycle of compression and decompression that takes the capacitance value C between 0 and $C_m$ is expressed as $E_1 = E_2 E_1 = 0.5 C_m V^2$.

Figure 6:
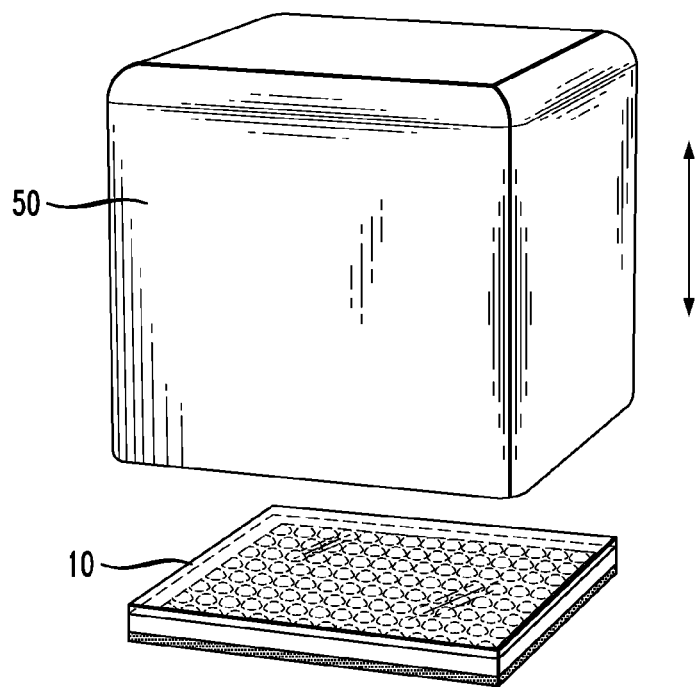
FIG. 6 illustrates one exemplary arrangement for imparting vibrational motion to the energy harvesting device of the present invention, in this case by attaching a proof mass to the device.

The compression of elastic spacer 16 can be achieved by various means. One exemplary method is shown in FIG. 6, where a proof mass 50 is attached to pad 10. The resultant assembly is then attached to a vibrating structure (not shown). The vibration of proof mass 50 will result in periodic compression of elastic spacer 16 and the creation of electric energy generation as discussed above. For example, it has been found that for a vibration on the order of 50 Hz, electric energy greater than 100 mW/cm$^2$ can be generated.

In another embodiment, is it possible to use a direct application of a periodic force by, for example, locating an energy harvesting pad 10 between two vibrating structures. Other arrangements are possible and are considered to fall within the scope of the present invention.

Figure 7:
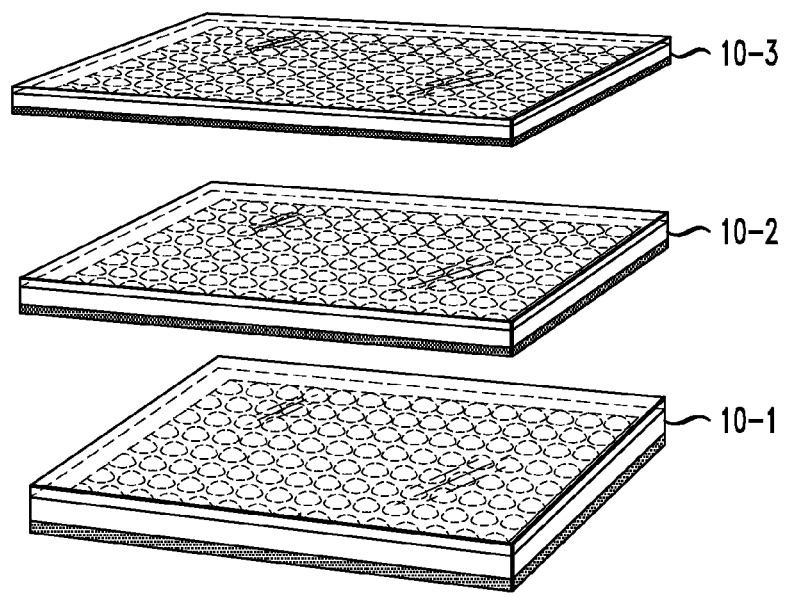
FIG. 7 is a simplified diagram of an alternative embodiment of the present invention, where a set of three separate energy harvesting devices are stacked one upon another to increase the amount of electrical energy harvested as a function of surface area (i.e., "footprint").

An exemplary embodiment of energy harvesting pad 10 may have an overall thickness (nominal) of only about 1 millimeter. Thus, it is possible to "stack" multiple pads and further increase the amount of electrical energy generated for a given "footprint" (surface area) of the harvesting system. One such stacked configuration 60 is shown in FIG. 7, where a set of three energy harvest pads 10-1, 10-2 and 10-3 are positioned in a vertical stack The stacked arrangement also allows for larger vibrational amplitudes to be used without redesigning the pad itself.

By applying an adhesive material to either substrate 12 or 22, energy harvesting pad 10 of the present invention may be directly affixed to a mobile device, allowing for seamless mechanical energy harvesting from vibrations, body motion and device handling, such as opening/closing, typing, etc on any type of mobile device (phone, tablet, or the like). The obtained electrical energy can be used to provide standby power or trickle-charge the mobile device battery. Unlike traditional kinetic harvester, the harvesting pad approach does not require dedicated proof mass, thus contributing very little to the total device weight and size.

Although the present invention has been described in detail, those of ordinary skill in the art should understand that they could make various changes, substitutions and alterations herein without departing from the scope of the invention.

What is claimed is:

1. An apparatus for converting mechanical energy into electrical energy comprising
    a plurality of electrically conductive liquid droplets disposed in a planar arrangement;
    a planar electrode disposed in a parallel, spaced-apart relationship with the plurality of electrically conductive liquid droplets;
    a dielectric layer positioned between the plurality of electrically conductive liquid droplets and the planar electrode so as to form a capacitive structure therewith;
    an elastic spacer element disposed between the plurality of electrically conductive liquid droplets and the planar electrode so as to surround said plurality of electrically conductive liquid droplets, such that the application of mechanical energy to the apparatus compresses the elastic spacer element and the plurality of electrically conductive liquid droplets, increasing a contact area between said plurality of electrically conductive liquid droplets and the dielectric layer and also an overlap area with the planar electrode; and
    an electrical circuit means, electrically coupled between the plurality of electrically conductive liquid droplets and the planar electrode so as to apply a bias voltage therebetween and transfer electrical current generated in response to the change in capacitance associated with the change in overlap area to a power consuming element.

2. An apparatus as defined in claim 1 wherein the apparatus is exposed to vibrational mechanical energy, creating a periodic cycle of compression and decompression of the elastic spacer so as to generate an electric current therefrom.

3. An apparatus as defined in claim 1 wherein the plurality of electrically conductive liquid droplets are supported on a substrate.

4. An apparatus as defined in claim 3 wherein the substrate comprises a dielectric material.

5. An apparatus as defined in claim 1 wherein the plurality of electrically conductive liquid droplets comprise a plurality of electrically conductive microfluidic droplets, each droplet having a volume in the range of picoliters to microliters.

6. An apparatus as defined in claim 1 wherein the plurality of electrically conductive liquid droplets are disposed in a planar array configuration.

7. A system for converting mechanical energy into electrical energy, the system including a plurality of separate planar components for performing the energy conversion, the plurality of separate planar components vertically stacked to minimize surface area coverage, wherein each separate planar component comprises
    a plurality of electrically conductive liquid droplets disposed in a planar arrangement;
    a planar electrode disposed in a parallel, spaced-apart relationship with the plurality of electrically conductive liquid droplets;
    a dielectric layer positioned between the plurality of electrically conductive liquid droplets and the planar electrode so as to form a capacitive structure therewith;
    an elastic spacer element disposed between the plurality of electrically conductive liquid droplets and the planar electrode so as to surround said plurality of electrically conductive liquid droplets, such that the application of mechanical energy to the apparatus compresses the elastic spacer element and the plurality of electrically conductive liquid droplets, increasing a contact area between said plurality of electrically conductive liquid droplets and the dielectric layer and also an overlap area with the planar electrode, increasing the capacitance value of the planar component; and
    an electrical circuit means, electrically coupled between the plurality of electrically conductive liquid droplets and the planar electrode so as to apply a bias voltage therebetween and transfer electrical current generated in response to the change in capacitance associated with the change in overlap area to a power consuming element,
    the current outputs from the separate planar components thereafter combined to provide the electrical energy output.

8. A method of converting mechanical energy into electrical energy comprising the steps of:
    disposing a plurality of individual electrically conductive liquid droplets on a substrate in a spaced-apart configuration;
    surrounding a periphery of the substrate with an elastic spacer element;
    covering the plurality of individual electrically conductive liquid droplets with a layer of dielectric material, the layer of dielectric material also covering the spacer element surrounding the periphery of the plurality of individual electrically conductive liquid droplets;
    positioning a planar electrode over the dielectric material so as to form a capacitive structure with the dielectric material and the plurality of electrically conductive liquid droplets;
    applying a predetermined bias voltage between the planar electrode and the plurality of electrically conductive liquid droplets; and
    subjecting the arrangement to a periodic mechanical force so as to compress and then decompress the elastic spacer and the plurality of electrically conductive liquid droplets in a manner to periodically change the capacitive value of the arrangement and create an electrical current output therefrom.

9. The method as defined in claim 8 wherein the periodic mechanical force is a vibrational motion.

\* \* \* \* \*